A. L. BAILEY.
GAS STOVE.
APPLICATION FILED MAR. 22, 1917.
1,258,084.
Patented Mar. 5, 1918.
2 SHEETS—SHEET 1.
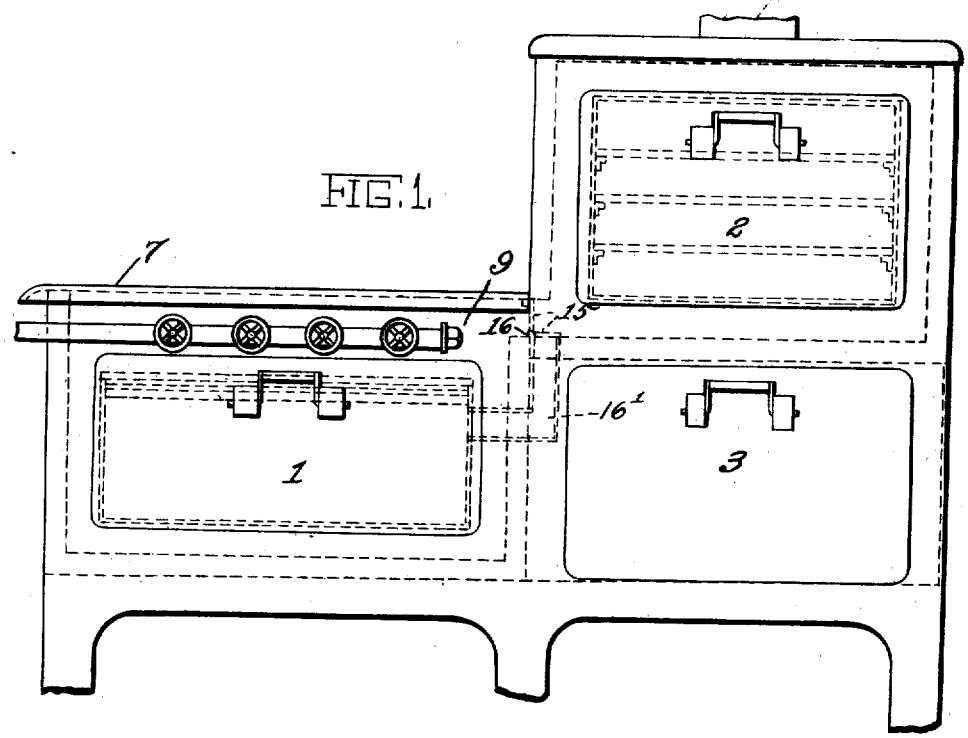
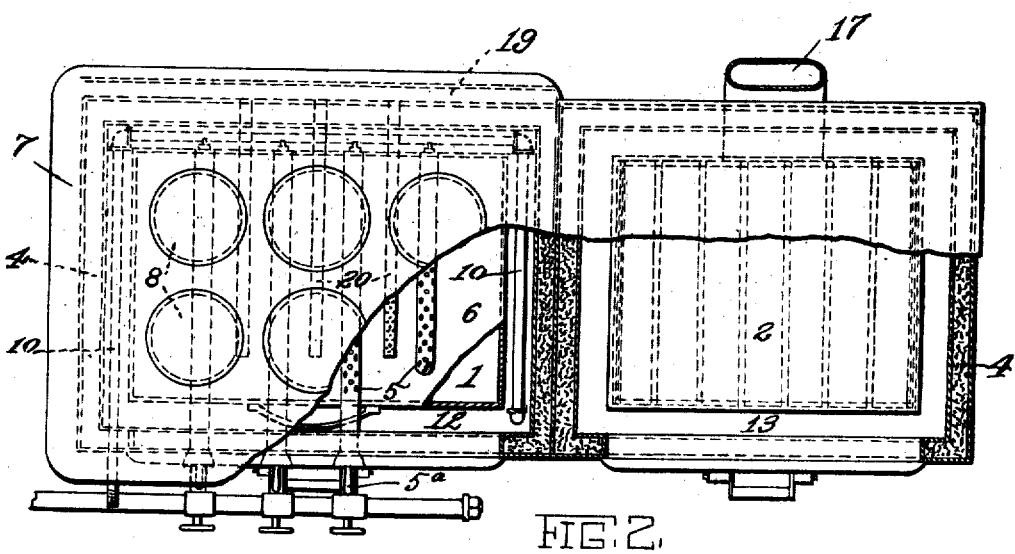
Inventor
Arthur L. Bailey
By Ellis Spear Jr.
Attorney

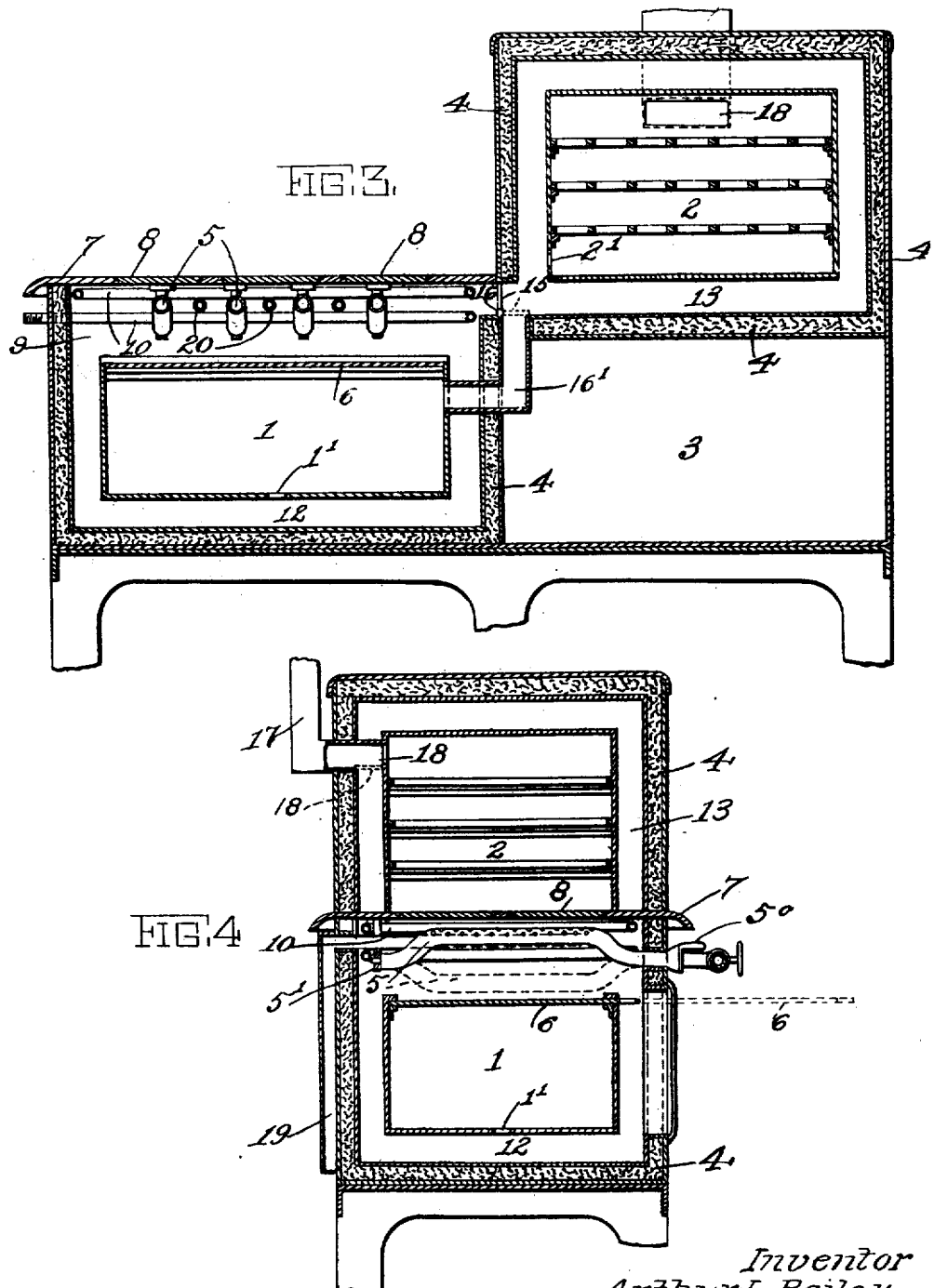

UNITED STATES PATENT OFFICE.

ARTHUR L. BAILEY, OF JAMAICA PLAIN, MASSACHUSETTS.

GAS-STOVE.

1,258,084.  Specification of Letters Patent.  Patented Mar. 5, 1918.

Application filed March 22, 1917. Serial No. 156,753.

*To all whom it may concern:*

Be it known that I, ARTHUR L. BAILEY, a citizen of the United States, residing at Jamaica Plain, county of Suffolk, Commonwealth of Massachusetts, have invented certain new and useful Improvements in Gas-Stoves, of which the following is a specification.

This invention relates to gas stoves, and has for its object to utilize to the greatest extent the heat given off by a single set of burners so that boiling, frying, baking, broiling, roasting and heating water may be accomplished with maximum economy of fuel.

In carrying out my invention, the usual set of cooking burners have their usual positions below the stove top. The direct heat from this single burner set heats the stove top upon which boiling and frying may be accomplished, and heats a water circulating coil located below said top within the burner chamber and connected with a boiler. The indirect heat from this set of burners is circulated about and through an oven of special construction designed to permit both broiling and baking, and about and through an auxiliary oven designed to permit baking or slow cookery, and in such circulation heats a warming compartment in which dishes and utensils may be placed for warming or to be kept warm.

The construction and operation of my invention is fully disclosed in the specification which follows, illustrated in the accompanying drawings, and particularly pointed out in the appended claims. Throughout the specification and drawings live reference numerals, are correspondingly applied, and in these drawings:

Figure 1 is a front elevation of a gas stove in accordance with my invention.

Fig. 2 is a plan view thereof partly broken away to illustrate the interior construction.

Fig. 3 is a longitudinal section, and

Fig. 4 is a transverse section through the lower oven, looking toward the elevated oven, the elevated oven being also shown in section.

My stove as here shown consists of three compartments indicated generally by the numerals 1, 2 and 3, all arranged within the stove walls proper, and preferably in the relation shown in the drawings. The compartment 1 is so designed as to permit either baking or broiling to be performed therein. The compartment 2 is an oven compartment designed to permit baking or slow cookery, and so arranged relatively as to be disposed at a height most convenient for use. The compartment 3 is located below the compartment 2 and opposite the compartment 1, and is intended to be used as a warming compartment or cabinet in which dishes and utensils may be placed, warmed or kept warm. The front sides of these compartments may be open, or they may be provided with any suitable closures, which with the usual outside oven doors (see Fig. 1) permit access to be had to the ovens. The ovens themselves may be supported by any suitable brackets.

All compartments are suitably heat-insulated, as indicated at 4, and all are heated by a single set of burners 5, located in the space between the removable top 6 of the compartment 1 and the superposed stove top 7. The slidable top 6 may be supported upon opposed lugs formed on the side walls of the oven 1 (see Fig. 4). There may be a series of these lugs, as shown in connection with the elevated oven, (Figs. 3 and 4) to provide supports at different heights in the oven for the usual pans or trays. The stove top 7 overlaps the burner set and is provided with a plurality of removable lids 8 overlying the burners 5 and permitting receptacles to be exposed to the direct action of the heat from the burners for purposes of boiling or frying. The tops 7 and 6 and the surrounding walls of the stove form a substantially closed chamber 9 for the burner set. The heat is trapped in this chamber and is circulated about the compartment 1, 2 and 3, as hereinafter explained.

Although my range may be economically operated with burners of the ordinary type, I prefer to use adjustable burners in order to secure the most efficient distribution of the heat, according to the particular cooking operation being performed. As here shown, the burners 5 are offset (see Fig. 4) so that when adjusted as indicated in full and dotted lines in said figure, the flame may be brought close to the stove top 7 or open top of the compartment 1, as the case may be. Each burner is journaled at one end in a bearing $5^1$ and is provided at its opposite end with a handle $5^a$ whereby it may be conveniently adjusted. When turned to the full line position of Fig. 4, the flame from the burner is brought close to and effectively directed against the under face of the stove top. When turned to the dotted line position, the flame is brought close to the article of food being broiled in the compartment 1, the top 6 of said compartment having first been withdrawn as indicated in dotted lines Fig. 4, to expose the oven contents to the direct action of the heat.

Located within the burner chamber 9 is a water-circulating coil 10 connected with a boiler (not shown), whereby the heat of the burners is utilized to heat water. The water-circulating coil as here shown is arranged about the edge of the stove within the burner chamber, as best shown in Fig. 2, so as not to obstruct the direct upward passage of the heat from the burners to the stove top. This exposes by far the greater area of the stove top to the direct action of the heat given off by the burners.

The compartments 1 and 2 are spaced from all the stove walls proper to provide a continuous heat circulating passage, leading from the burner chamber 9 about and through said compartments, the compartments being perforated as indicated at 1¹ and 2¹ to permit circulation of the heat therethrough. The heat circulating passage about the oven 1 is indicated at 12 and the passage about the elevated oven 2 at 13. The circulation of the products of combustion from the burners 5 directly into the elevated oven chamber 2 through the ports 2' may be prevented, however, by a damper, if desired. The passage 12 opens into the chamber 9 and is therefore in constant communication with said chamber 9. The passage of the heat from the chamber 9 into the passage 13 is controlled by a damper 15 mounted in the lower portion of said passage on a shaft 16 operable externally of the stove. When in the full line position shown in Fig. 3, this damper shuts off the passage 13 from direct communication with said chamber. The heat, or a portion of it, may however indirectly enter the passage 13 when the damper is so positioned, but only after it has circulated through the oven 1. In such circulation, if the sliding top 6 be in the full line position shown in Fig. 4, the heat passes through a pipe or flue 16' leading from said oven to the passage 13, and as here shown having its delivery end so disposed as to be closed by the damper 15 when said damper is swung to the dotted line position shown in Fig. 3. The passage 13 connects with a flue or other source of draft 17, which as here shown communicates with the oven 2 (see Fig. 4) and is controlled by a damper 18 similar to the damper 15 and mounted to close the elevated oven 2 when in one position, as indicated in full lines, Fig. 4 and to close the passage 13 when in the dotted line position of said figure. When the damper 18 is in the full line position of Fig. 4, it prevents exit of the heat from the elevated oven 2, and this oven being thus closed, readily becomes heated and retains its heat. The heat circulating through the passage 13 about the oven 2 of course passes out through the flue 17, and the draft from the burner chamber 9 is through the passage 13. When the damper is in the dotted line position of Fig. 4, the draft from the burner chamber is through the elevated oven 2 and along the passage 13 either direct from the burner passage 13 or through the pipe 16', oven 1 and chamber or through the pipe 16', oven 1 and passage 12 to said chamber according to the position of the damper 15 as will be understood. The heat from the burners thus passes along the passage 13 around the oven 2 and through the ports 2¹, and thence out through the opening now uncovered by the damper 18 out into the flue 17.

If desired, the air taken into the burner chamber may be given a preliminary heating, as by forming an air intake flue or conduit 19 along one wall of the stove. The air drawn into the conduit is delivered to the burners 5 by a series of perforated distributing pipes 20 arranged in and discharging the air in a series of jets best suited for combustion.

Various modifications in the form and construction of my invention may obviously be resorted to if within the limits of the appended claims.

What I therefore claim and desire to secure by Letters Patent is:—

1. In a stove, a stove top and stove walls defining a wholly closed chamber, a combination baking and broiling oven arranged within and spaced from all the stove walls and from the stove top to define a continuous heat circulating passage, that portion of said passage between the oven top and the stove top constituting a burner chamber, means whereby air may enter said burner chamber, a burner in said burner chamber constituting the only heat source for said stove top and combination oven, and the top of said oven being removable and adapted when removed to expose the contents of the oven to the direct heat from the burner whereby broiling may be accomplished in said oven while cooking is being accomplished on said stove top, and adapted when in place to protect the oven contents against the direct heat of the burner, permitting the heat from the burner to circulate along said passage about the oven whereby baking may be accomplished while cooking is being accomplished on said stove top.

2. In a stove, a stove top and stove walls defining a wholly closed chamber, a combination baking and broiling oven arranged within and spaced from all the stove walls and from the stove top to define a continuous heat circulating passage, a burner below said stove top constituting the only heat source for said stove top and combination oven, and having an offset heat delivery portion adjustable toward and from said stove top and oven top, and the top of said oven being removable and adapted when removed to expose the contents of the oven to the direct heat from the burner whereby broiling may be accomplished in said oven while cooking is being accomplished on said stove top, and adapted when in place to protect the oven contents against the direct heat of the burner, permitting the heat from the burner to circulate along said passage about the oven whereby baking may be accomplished while cooking is being accomplished on said stove top.

3. In a stove, a stove top and stove walls defining a wholly closed chamber, a combination baking and broiling oven arranged within and spaced from all the stove walls and from the stove top to define a continuous heat circulating passage, a water circulating coil beneath said stove top and at the edge thereof, that portion of said passage between the oven top and the stove top constituting a burner chamber, means whereby air may enter said burner chamber, a burner arranged in said burner chamber within the confines of said coil whereby the heat may pass directly to the stove top without obstruction by the coil, and constituting the only heat source for said stove top, coil and combination oven, and the top of said oven being removable and adapted when removed to expose the contents of the oven to the direct heat from the burner whereby broiling may be accomplished in said oven while cooking is being accomplished on said stove top, and adapted when in place to protect the oven contents against the direct heat of the burner, permitting the heat from the burner to circulate along said passage about the oven whereby baking may be accomplished while cooking is being accomplished on said stove top and water is being heated in said coil.

4. In a stove having a cooking top, a combination baking and broiling oven arranged within and spaced from all the stove walls and from the cooking top to define a continuous heat-circulating passage, that portion of the passage between the cooking top and the top of the oven constituting a burner chamber, a burner therein and constituting the only heat source for said stove top and said combination oven, and the top of said oven being removable and adapted when removed to expose the contents of the oven to the direct heat from the burner whereby broiling may be accomplished in said oven while cooking is being accomplished on said stove top, and adapted when in place to protect the oven contents against the direct heat of the burner, permitting the heat from the burner to circulate along said passage about the oven, whereby baking may be accomplished while cooking is being accomplished on said stove top, and a second oven spaced from all stove walls and from the combination oven to provide a continuous heat circulating passage communicating with said burner chamber and adapted to be heated therefrom.

5. In a stove having a cooking top, a combination baking and broiling oven arranged within and spaced from all the stove walls and from the cooking top to define a continuous heat-circulating passage, that portion of the passage between the cooking top and the top of the oven constituting a burner chamber, a burner therein and constituting the only heat source for said stove top and said combination oven, and the top of said oven being removable and adapted when removed to expose the contents of the oven to the direct heat from the burner whereby broiling may be accomplished in said oven while cooking is being accomplished on said stove top, and adapted when in place to protect the oven contents against the direct heat of the burner, permitting the heat from the burner to circulate along said passage about the oven, whereby baking may be accomplished while cooking is being accomplished on said stove top, and a second oven spaced from all stove walls and from the combination oven to provide a continuous heat circulating passage communicating with said burner chamber and adapted to be heated therefrom, the passage about said second-named oven communicating both directly and indirectly with the passage about said combination oven, and a single damper having two effective positions and adapted when in one of said positions to prevent the direct supply of heat from the burner chamber to the passage about said second-named oven and to permit indirect supply of heat therefrom to the said passage, and when in its other position adapted to permit said direct supply and prevent said indirect supply.

6. In a stove, a stove top and stove walls defining a wholly closed chamber, a door in one of said stove walls, an oven arranged within and spaced from all the stove walls and from the cooking top to define a continuous heat-circulating passage, the space between the cooking top and the top of the oven constituting a burner chamber extending coextensive with the stove top and communicating with said passage at each side of the oven, a burner in said burner chamber and constituting the only heat source for said stove top and said oven, and a second oven arranged within and spaced from all stove walls and from said oven to define a continuous heat circulating passage communicating with said burner chamber whereby said second-named oven is heated solely from said burner in the burner chamber.

7. In a stove having a cooking top, a pair of compartments one arranged beneath said top and one laterally thereof and spaced from all stove walls to define continuous heat circulating passages directly communicating with each other, the space between the lower compartment and the cooking top constituting a burner chamber with which the passage about the lateral compartment indirectly connects, a single damper having two effective positions and in one position preventing the direct communication of said passage about the lateral compartment with the burner chamber and permitting indirect communication, and in its other position permitting said direct communication and preventing said indirect communication, and a single burner set in said chamber and constituting the only heat source for both of said compartments and for the cooking top.

8. In a stove having a cooking top, a compartment arranged below said top and spaced therefrom and spaced from all of the stove walls to define a continuous heat circulating passage, a heat source located in the space between the cooking top and the top of said compartment, a second compartment arranged laterally of the first-named compartment and spaced from all of the stove walls to define a continuous heat circulating passage, the lower portion of said passage being alined with the upper portion of the passage about the first-named compartment for direct communication with the heat source, a flue connecting said lower portion for indirect communication with the heat source, and a single damper mounted at the juncture of said passages with each other and having two effective positions, in one of which it blocks said passages shutting off said direct communication, and allowing said indirect communication, and in the other position, closing the indirect communication through said flue and allowing said direct communication.

9. In a stove having a cooking top and a water heating coil arranged below said top at the edge thereof, an oven having a removable top and arranged below said cooking top and spaced therefrom and from all stove walls to define a continuous heat circulating passage, a single burner arranged in said passage between the top of the oven and the cooking top of the stove and within the edge of the coil so that the heat may pass directly to the cooking top for ordinary cooking operations without loss of radiant energy by contact with the coil, the top of the oven when in place adapting the oven for baking by means of the circulated heat from said burner set and when removed adapting the oven for broiling by exposing the oven contents to the direct action of the heat from the burner, an elevated compartment spaced from all stove walls to define a continuous heat circulating passage connecting with the space in which the burner is mounted, said burner constituting the only heat source for the stove and enabling the several operations of frying or cooking on the cooking top, heating water by means of the coil, baking or roasting or warming over in the lower oven, or broiling in the lower oven, or baking, roasting or warming over in the elevated oven to be simultaneously performed.

10. In a stove, a compartment spaced from all stove walls to provide a continuous heat circulating passage, and having an inlet port in one of its walls connecting said passage with the interior of the compartment, a heat source communicating with said passage, a flue leading from said compartment and having communication with said passage, and a single damper mounted to close the opening of said flue into said compartment when in one position and to open the communication between the flue and said heat circulating passage whereby the heat from the heat source passes around said passage and out through the flue, and said damper closing the communication of said flue with said heat-circulating passage, and opening the communication of said compartment with the flue in another position whereby the heat from the heat source passes around the compartment and into the same through said inlet port and thence through the compartment and out into the flue.

11. In a stove, a pair of compartments spaced from all stove walls to provide continuous heat circulating passages communicating directly and indirectly with each other, a single damper having two effective positions and in one position blocking said direct communication and allowing said indirect communication and in its other position blocking said indirect communication and allowing said direct communication, a heat source communicating with said passage, one of said compartments having an inlet port in a wall thereof connecting the passage about said compartment with the interior of the compartment, a flue leading from said last-named compartment and having communication with said passage thereabout, and a single damper mounted to close the opening of said flue into said last-named compartment when in one position and to open the communication between the flue and said heat circulating passage thereabout whereby the heat from the heat source passes around said passage and out through the flue, and said damper closing the communication of said flue with said heat-circulating passage, and opening the communication of said last-named compartment with the flue in another position whereby the heat from the heat source passes around said last-named compartment and into the same through said inlet port and thence through said last-named compartment and out into the flue.

12. In a stove, a burner chamber, a compartment spaced from the stove walls to define a continuous heat circulating passage, and provided with inlet ports opening into said passage, and said passage communicating with the burner chamber, a flue leading from said compartment and having communication with said passage, and a single damper mounted to close the opening of said flue into the compartment in one position thereof and open the communication of said flue with the heat circulating passage, whereby the heat from the burner chamber passes around said compartment and out through the flue, and said damper closing the communication of said flue with the heat-circulating passage and opening the communication of the compartment with the flue in another position whereby the heat from the burner chamber passes around the compartment and into the same through said inlet ports and thence through the compartment and out into the flue.

13. In a stove, a burner chamber, a compartment spaced from the stove walls to define a continuous heat circulating passage, and provided with inlet ports opening into said passage, said passage having direct and indirect communication with the burner chamber, means controlling both the direct and indirect communication, a flue leading from said compartment and having communication with said passage, and a single damper mounted to close the opening of said flue into the compartment in one position thereof and open the communication of said flue with the heat circulating passage whereby the heat from the burner chamber passes around said compartment and out through the flue, and said damper closing the communication of said flue with the heat-circulating passage and opening the communication of the compartment with the flue in another position whereby the heat from the burner chamber passes around the compartment and into the same through said inlet ports and thence through the compartment and out into the flue.

14. In a stove having a closed top constituting a cooking surface, a compartment arranged below said stove top and within and spaced from the stove walls and defining therewith a continuous heat circulating passage about said compartment, the space between the stove top and burner constituting a burner chamber wholly open to said passage, a burner in said chamber, an air supply to said chamber, said burner chamber being otherwise wholly closed whereby all the heat from said burner may be utilized for cooking operations, a second compartment spaced from the stove walls to define a heat circulating passage and provided with inlet ports opening into said passage, and said passage having direct communication with the burner chamber and indirect communication with the passage about said first-named compartment, a single damper controlling both the direct and indirect communication between said passages according to its position, a flue leading from the second-named compartment and having communication with the passage thereabout, and a single damper controlling the opening of said flue into said compartment and the opening of said flue into the passage about said compartment according to its position.

15. In a stove having a closed top, constituting a cooking surface, a compartment arranged below said top, a compartment arranged laterally of said top above the same, said compartments spaced from the stove walls and defining therewith a heat circulating passage continuously about each compartment and in direct communication with each other, the elevated compartment and the passage thereabout being in communication, and the space between said cooking top and the compartment therebeneath constituting a burner chamber, a burner in said chamber and constituting the only heat source for said cooking top and compartments, a by-pass indirectly connecting the passage about the elevated compartment with the burner chamber, a single damper arranged when in one position to block the direct communication between said passages and permit indirect communication through said by-pass and in another position to permit said direct communication and prevent said indirect communication, a flue leading from elevated compartment and having communication with the passage about said compartment, and a single damper mounted to close the opening of said flue into the said compartment and open the communication of the flue with said passage when in one position, and to place said flue and elevated compartment in communication and to destroy the communication between said flue and the passage about said elevated compartment when in another position.

16. In a stove, a lower compartment spaced from the stove walls to provide a continuous heat circulating passage, a burner chamber communicating with said passage, a cooking top above said chamber, a single burner set in said chamber and constituting the only heat source for the stove, an elevated compartment spaced from the stove walls to define a continuous heat circulating passage, and provided with ports opening into said passage, and said passage communicating with the burner chamber, a flue leading from said elevated compartment and having communication with the passage about the same, and a single damper mounted to close the opening of said flue into the elevated compartment in one position thereof and open the communication of said flue with the heat circulating passage whereby the heat from the burner chamber passes around said elevated compartment and out through the flue, and said damper closing the communication of said flue with the heat circulating passage about the elevated compartment and opening the communication of said compartment with the flue in another position whereby the heat from the burner chamber passes around the compartment and into the same through said inlet ports and thence through the compartment and out into the flue.

In testimony whereof I affix my signature in presence of two witnesses.

ARTHUR L. BAILEY.

Witnesses:
 VICTORIA LOWDEN,
 GEORGE B. RAWLINGS.